US012355165B2

(12) United States Patent
Wu et al.

(10) Patent No.: US 12,355,165 B2
(45) Date of Patent: Jul. 8, 2025

(54) ELECTRONIC DEVICE

(71) Applicant: PEGATRON CORPORATION, Taipei (TW)

(72) Inventors: Chien-Yi Wu, Taipei (TW); Chih-Wei Liao, Taipei (TW); Chao-Hsu Wu, Taipei (TW); Hau Yuen Tan, Taipei (TW); Shih-Keng Huang, Taipei (TW); Cheng-Hsiung Wu, Taipei (TW); Chia-Hung Chen, Taipei (TW); Sheng-Chin Hsu, Taipei (TW); Hao-Hsiang Yang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 251 days.

(21) Appl. No.: 18/317,862

(22) Filed: May 15, 2023

(65) Prior Publication Data

US 2024/0006769 A1 Jan. 4, 2024

(30) Foreign Application Priority Data

Jul. 4, 2022 (TW) .................................. 111124879

(51) Int. Cl.

| | |
|---|---|
| ***H01Q 9/04*** | (2006.01) |
| ***H01Q 1/12*** | (2006.01) |
| ***H01Q 1/24*** | (2006.01) |
| ***H01Q 5/371*** | (2015.01) |
| ***H01Q 21/28*** | (2006.01) |

(52) U.S. Cl.

CPC ............. *H01Q 9/0407* (2013.01); *H01Q 1/12* (2013.01); *H01Q 1/243* (2013.01); *H01Q 5/371* (2015.01); *H01Q 9/04* (2013.01); *H01Q 21/28* (2013.01)

(58) Field of Classification Search

CPC ........ H01Q 9/0407; H01Q 1/12; H01Q 5/371; H01Q 1/243; H01Q 21/28; H01Q 9/04

See application file for complete search history.

(56) References Cited

U.S. PATENT DOCUMENTS

| | | | | |
|---|---|---|---|---|
| 10,559,882 | B2 | 2/2020 | Lee et al. | |
| 2018/0006364 | A1* | 1/2018 | Wu | H01Q 5/30 |
| 2018/0331415 | A1* | 11/2018 | Wu | H01Q 1/2266 |

(Continued)

FOREIGN PATENT DOCUMENTS

| | | |
|---|---|---|
| CN | 104466390 | 3/2015 |
| CN | 104701619 | 6/2015 |
| TW | 200514303 | 4/2005 |

*Primary Examiner* — Hai V Tran

(74) *Attorney, Agent, or Firm* — J.C. PATENTS

(57) ABSTRACT

An electronic device including a metal bottom plate, a metal frame and at least one radiator is provided. The metal bottom plate includes at least one ground terminal. The metal frame includes at least one slot, at least one disconnecting part, at least one first connecting part and at least one second connecting part. The disconnecting part includes a first part and a second part. Each radiator includes a first terminal and a second terminal. The second terminal is connected to a junction between the first part and the second part. The first terminal, the second terminal, the first part, the first connecting part and the ground terminal form a first antenna path radiating at a first frequency band. The first terminal, the second terminal, the second part, the second connecting part and the ground terminal form a second antenna path radiating at a second frequency band.

10 Claims, 8 Drawing Sheets

(56) References Cited

U.S. PATENT DOCUMENTS

| | | | | |
|---|---|---|---|---|
| 2019/0097308 | A1* | 3/2019 | Chen | H01Q 1/243 |
| 2023/0046925 | A1* | 2/2023 | Jang | H01Q 9/42 |
| 2023/0344140 | A1* | 10/2023 | Kwon | H01Q 1/52 |
| 2023/0402767 | A1* | 12/2023 | Wu | H01Q 21/30 |

* cited by examiner

ELECTRONIC DEVICE

CROSS-REFERENCE TO RELATED APPLICATION

This application claims the priority benefit of Taiwan application serial no. 111124879, filed on Jul. 4, 2022. The entirety of the above-mentioned patent application is hereby incorporated by reference herein and made a part of this specification.

BACKGROUND

Technology Field

The invention relates to an electronic device, and particularly relates to an electronic device with one or more antennas.

Description of Related Art

Most electronic devices with metal casings adopt a design of an exposed antenna. However, the design of the exposed antenna is difficult to meet aesthetic demand for a metal texture. Therefore, how to configure an antenna on an electronic device with a metal casing to meet the aesthetic demand for the metal texture and have good antenna radiation performance will be a research goal in this field.

SUMMARY

The invention is related to an electronic device, which has an aesthetic appearance with metal texture and good antenna radiation performance.

The invention provides an electronic device including a metal bottom plate, a metal frame and at least one radiator. The metal bottom plate includes at least one ground terminal. The metal frame includes at least one slot, at least one disconnecting part, at least one first connecting part and at least one second connecting part. Each slot is close to the metal bottom plate and separates the metal bottom plate from the corresponding disconnecting part. Each disconnecting part is located between the corresponding first connecting part and the corresponding second connecting part, and each disconnecting part includes a first part and a second part. The first part is close to the corresponding first connecting part, the second part is close to the corresponding second connecting part, and each first connecting part and each second connecting part are connected to the metal bottom plate. Each radiator has a plurality of turnings and includes a first terminal and a second terminal. The first terminal is a feeding terminal, and the second terminal intersects with the corresponding disconnecting part at a junction, and the junction is away from the corresponding slot. The first terminal and the second terminal of each radiator, the first part of the corresponding disconnecting part, the corresponding first connecting part and the ground terminal of the metal bottom plate form a first antenna path, and the first antenna path radiates at a first frequency band. The first terminal and the second terminal of each radiator, the second part of the corresponding disconnecting part, the corresponding second connecting part and the ground terminal of the metal bottom plate form a second antenna path, and the second antenna path radiates at a second frequency band.

In an embodiment of the invention, each radiator extends in a normal direction of the metal frame and reaches the junction at the second terminal.

In an embodiment of the invention, a length of the first antenna path is between and 0.75 times of a wavelength of the first frequency band.

In an embodiment of the invention, a length of the second antenna path is between 0.5 and 0.75 times of a wavelength of the second frequency band.

In an embodiment of the invention, a width of each slot is between 1 mm and 1.5 mm.

In an embodiment of the invention, the electronic device further includes at least one insulation bracket arranged adjacent to the at least one slot, the metal frame and the metal bottom plate, each insulation bracket includes a first surface and a second surface adjacent to each other, and each radiator includes a first section located on the first surface, and a second section, a third section and a fourth section located on the second surface, the feeding terminal is located at the first section, and the turnings are among the first section, the second section, the third section and the fourth section.

In an embodiment of the invention, the radiator further includes a first U-shaped section and a second U-shaped section, the first U-shaped section is located between the second section and the third section, and the second U-shaped section is located between the third section and the fourth section.

In an embodiment of the invention, each ground terminal is close to the corresponding feeding terminal and separated from the feeding terminal.

In an embodiment of the invention, the at least one slot includes a plurality of slots, the at least one radiator includes a plurality of radiators, positions of the radiators correspond to positions of the slots, the slots and the radiators are arranged at equal intervals on the metal frame, and the slots are located on a same plane.

In an embodiment of the invention, the at least one slot includes a plurality of slots, the at least one radiator includes a plurality of radiators, the radiators correspond to the slots, some of the slots are symmetrically located on a first plane, and some of the slots are symmetrically located on a second plane.

Based on the above description, in the electronic device of the invention, the slot separates the metal bottom plate from the corresponding disconnecting part, and the second terminal of each radiator is connected to the junction that is away from the slot and the second terminal is located between the first part and the second part of the disconnecting part. The first terminal and the second terminal of each radiator, the first part of the corresponding disconnecting part, the corresponding first connecting part and the ground terminal of the metal bottom plate form the first antenna path. The first terminal and the second terminal of each radiator, the second part of the corresponding disconnecting part, the corresponding second connecting part and the ground terminal of the metal bottom plate form the second antenna path. In this way, by using the metal frame as a part of the antenna radiator, the electronic device further defines the first antenna path that radiates at the first frequency band and the second antenna path that radiates at the second frequency band, so that the electronic device has a good performance. In addition, since the metal frame of the electronic device is used as a part of the antenna radiator, a casing of the electronic device may be designed to adopt a metal material to achieve a better looking appearance.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
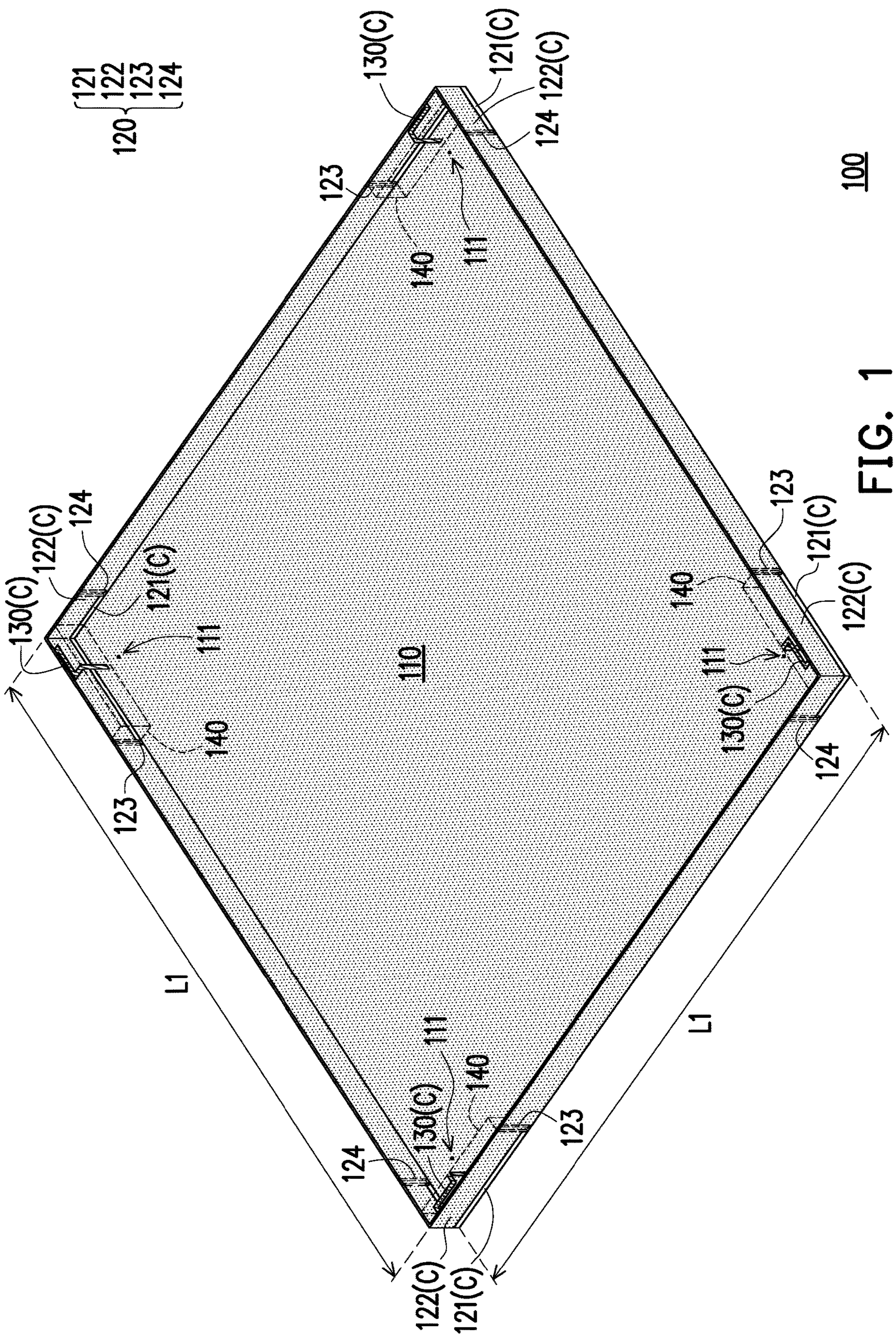
FIG. 1 is a schematic diagram of an electronic device according to an embodiment of the invention.
Figure 2:
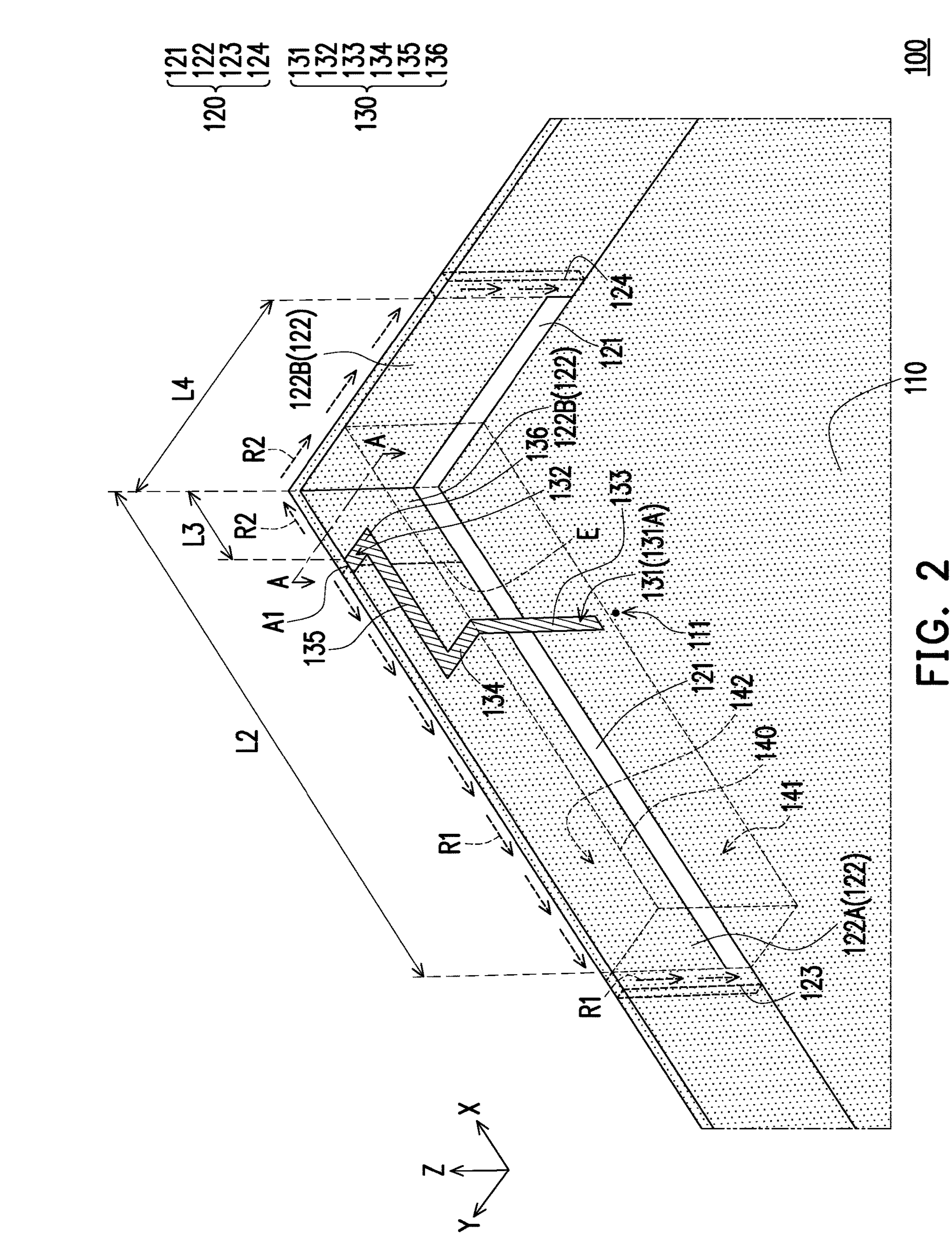
FIG. 2 is a partially enlarged view of the electronic device of FIG. 1.

FIG. 1 is a schematic diagram of an electronic device according to an embodiment of the invention, and FIG. 2 is a partially enlarged view of the electronic device of FIG. 1.

It should be noted that some components in FIG. 1 and FIG. 2 are drawn in a perspective manner to achieve the purpose of clear representation and easy explanation. In addition, FIG. 1 and FIG. 2 only show components related to the antenna, and hide other components, such as a circuit board, a battery or other electronic components.

Referring to FIG. 1 and FIG. 2, the electronic device 100 of the embodiment includes a metal bottom plate 110, a metal frame 120 and at least one radiator 130. The metal bottom plate 110 includes at least one ground terminal 111, and the metal frame 120 includes at least one slot 121, at least one disconnecting part 122, at least one first connecting part 123 and at least one second connecting part 124. The slots 121, the disconnecting parts 122, the radiators 130 and the metal bottom plate 110 jointly form antenna modules C (FIG. 1).

It should be noted that, in the embodiment, the numbers of the slots 121 and the numbers of the radiators 130 are, for example, both four, and positions and the number of the radiators 130 correspond to positions and the number of the slots 121. The four slots 121 and the four radiators 130 are arranged at equal intervals at four corners of the metal frame, and the four slots 121 are all located on a same plane of the metal frame 120.

Moreover, in the embodiment, the number of the ground terminals 111, the number of the disconnecting parts 122, the number of the first connecting parts 123 and the number of the second connecting parts 124 are also four. However, in other embodiments of the invention, the number of the slots 121, the number of the radiators 130, the number of the ground terminals 111, the number of the disconnecting parts 122, the number of the first connecting parts 123, and the number of the second connecting parts 124 of the electronic device 100 may not be four, which is not limited by the invention.

FIG. 2 illustrates components at one of the four corners. As shown in FIG. 2, in the embodiment, the slot 121 is close to the metal bottom plate 110, and the slot 121 separates the metal bottom plate 110 from the corresponding disconnecting part 122. The disconnecting part 122 is located between the corresponding first connecting part 123 and the corresponding second connecting part 124 as shown in FIG. 2, and the disconnecting part 122 includes a first part 122A and a second part 122B. The first part 122A is close to the corresponding first connecting part 123, and the second part 122B is close to the corresponding second connecting part 124. The first connecting part 123 and the second connecting part 124 are connected to the metal bottom plate 110 as shown in FIG. 2.

It should be noted that the slot 121 of the embodiment may be filled with light-transmitting plastic where the metal bottom plate 110 is separated from the disconnecting part 122, and components such as LED notification lights, etc., may be disposed in the electronic device in correspondence with the positions of the light-transmitting plastic to provide another visual effect on the appearance of the electronic device 100. In other embodiments of the invention, the material filled in the slot 121 is not limited thereto.

In the embodiment, as shown in FIG. 2, the radiator 130 has a plurality of turnings (not marked) as shown in FIG. 2, and includes a first terminal 131 and a second terminal 132. The first terminal 131 is a feeding terminal 131A, and the second terminal 132 is connected to a junction A1 that is between the first part 122A and the second part 122B of the corresponding disconnecting part 122. The position of the junction A1 is on a boundary line E between the first part 122A and the second part 122B and intersects with the second terminal 132, and the junction A1 is away from the corresponding slot 121. The ground terminal 111 of the metal bottom plate 110 is close to and separated from the corresponding feeding terminal 131A.

In the embodiment, a coaxial cable utilized as a transmission line (not shown) is connected between the ground terminal 111 and the feeding terminal 131A, and an inner conductor of the coaxial transmission line as positive terminal is connected to the feeding terminal 131A, and a metallic shield as negative terminal thereof is connected to the ground terminal 111. The radiator 130 may be connected to an antenna circuit board (not shown) through the coaxial cable. However, in other embodiments of the invention, the component connecting the radiator 130 and the antenna circuit board may not be the coaxial cable, which is not limited to the present invention.

Figure 3:
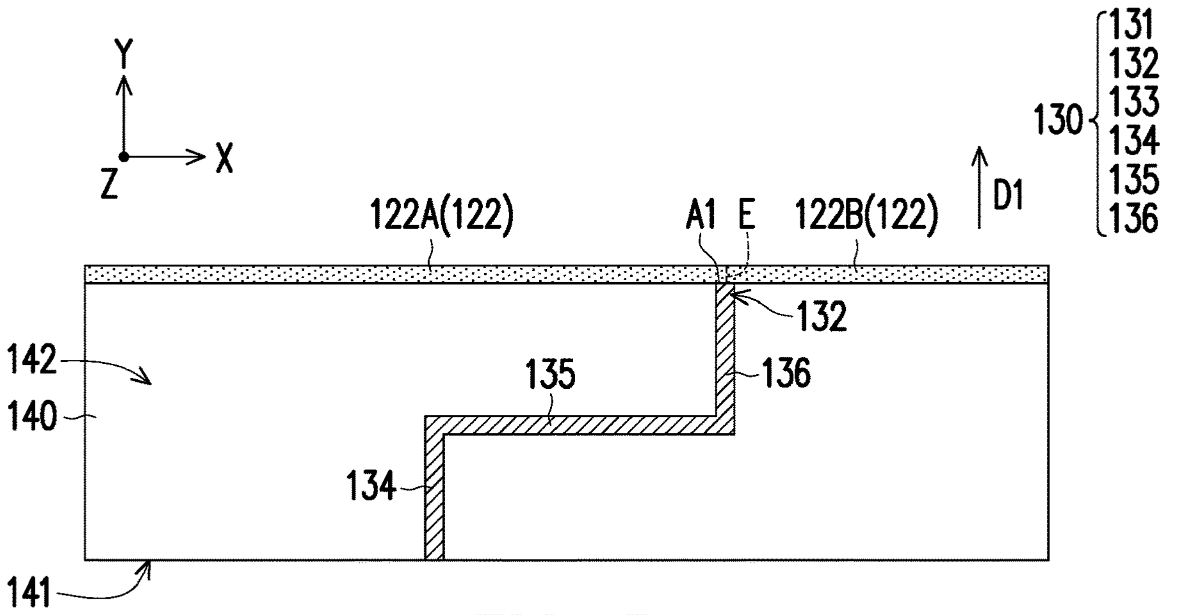
FIG. 3 is a schematic top view of the electronic device of FIG. 2.

FIG. 3 is a schematic top view of the electronic device of FIG. 2. Referring to FIG. 2 and FIG. 3, further, the radiator 130 of the embodiment extends in a normal direction D1 (FIG. 3) of the metal frame 120 as shown in FIG. 3 and reaches the junction A1 at the second terminal 132, and the normal direction D1 is perpendicular to the first part 122A and the second part 122B of the metal frame 120. In other words, the second terminal 132 of the radiator 130 is connected to the junction A1 in a direction perpendicular to the metal frame 120 on an XY plane. Compared with an antenna device designed in the manner of slot coupling in the prior art, antenna characteristics of the electronic device 100 are less affected by issues of coupling spacing and overcome difficulty of assembly alignment tolerance.

In the embodiment, the electronic device 100 further includes an insulation bracket 140. The insulation bracket 140 is disposed adjacent to the slot 121, the metal frame 120 and the metal bottom plate 110 as shown in FIG. 2, and the insulation bracket 140 includes a first surface 141 and a second surface 142 adjacent to each other. The radiator 130 is disposed on the insulation bracket 140, and the radiator 130 extends from the first surface 141 to the second surface 142. The radiator 130 includes a first section 133 located on the first surface 141 and a second section 134, a third section 135, and a fourth section 136 located on the second surface 142. The feeding terminal 131A is located at the first segment 133, and the first segment 133 and the fourth segment 136 include the first terminal 131 and the second terminal 132, respectively, of the radiator 130 as shown in FIG. 2.

In addition, the turnings of the radiator 130 in the embodiment are among the first section 133, the second section 134, the third section 135 and the fourth section 136. It should be noted that by adjusting the turning and a width between the second segment 134 and the third segment 135, and the turning and a width between the third segment 135 and the fourth segment 136 of the radiator 130 as shown in FIG. 3, impedance matching of the electronic device 100 may be adjusted for customizations. In the embodiment, the turnings between the second section 134 and the third section 135, and between the third section 135 and the fourth section 136 are right angles, but in other embodiments of the invention, the turnings of the radiator 130 may not be right angles, and the impedance matching of the electronic device may be adjusted by increasing a width, adding a groove, or increasing a meandering degree of the third section 135, which is not limited by the invention.

Referring to FIG. 1 and FIG. 2, the metal bottom plate 110 of the embodiment is a square as shown in FIG. 1, and a length L1 of the metal bottom plate 110 is 200 mm. A length L2 (FIG. 2) from a junction of the first connecting part 123 and the first part 122A to a vertical corner of the metal frame 120 is 35 mm, and a length L3 (FIG. 2) from the junction A1 to the vertical corner of the metal frame 120 is 5 mm. A length L4 (FIG. 2) from the vertical corner of the metal frame 120 to a junction of the second part 122B and the second connecting part 124 is 15 mm.

Figure 4:
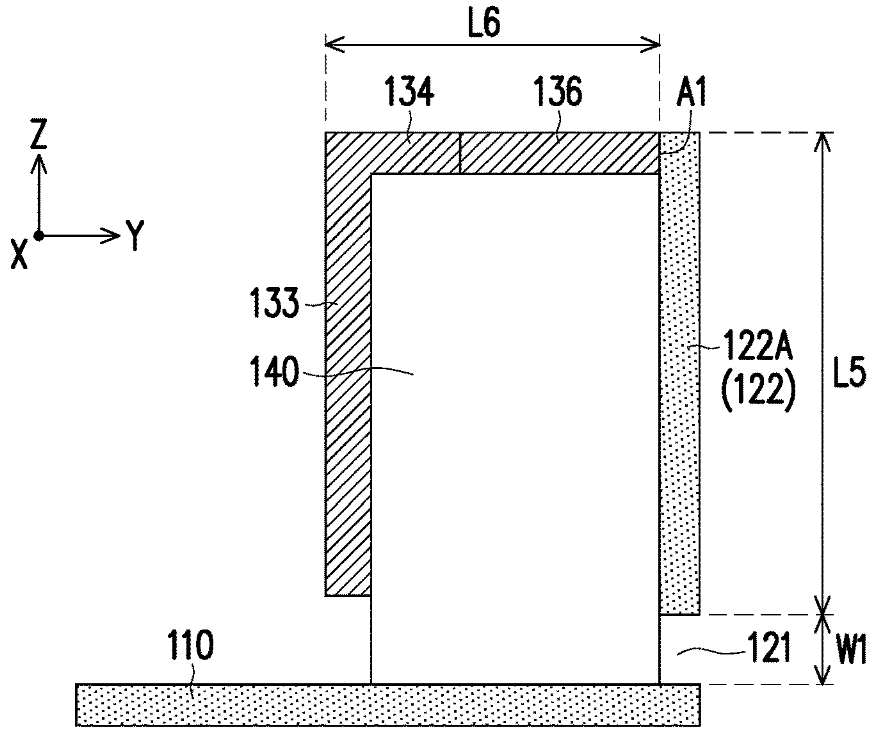
FIG. 4 is a schematic cross-sectional view of the electronic device of FIG. 2 viewing along an AA section.

FIG. 4 is a schematic cross-sectional view of the electronic device of FIG. 2 viewing along an AA section. Referring to FIG. 2 to FIG. 4, a width W1 of the slot 121 is 1.2 mm as shown in FIG. 4, and the width W1 may be between 1 mm and 1.5 mm, and a distance L5 (FIG. 4) between the junction A1 and the slot 121 is ⅛ times of a wavelength of a frequency band of the electronic device 100. In addition, a distance L6 (FIG. 3 and FIG. 4) from a junction of the first section 133 and the second section 134 to the junction A1 is 5 mm.

In the embodiment, the first terminal 131 and the second terminal 132 of the radiator 130, the first part 122A of the corresponding disconnecting part 122, the corresponding first connecting part 123 and the ground terminal 111 of the metal bottom plate 110 form a first antenna path R1 as shown in FIG. 2, and the first terminal 131 and the second terminal 132 of the radiator 130, the second part 122B of the corresponding disconnecting part 122, the corresponding second connecting part 124 and the ground terminal 111 of the metal bottom plate 110 form a second antenna path R2 as shown in FIG. 2. The first antenna path R1 is suitable for radiating at a first frequency band, and the second antenna path R2 is suitable for radiating at a second frequency band.

In detail, a frequency range corresponding to the first frequency band in the embodiment is 2400-2484 MHz, and a frequency range corresponding to the second frequency band is 5150-7125 MHz. A length of the first antenna path R1 is between 0.5 and 0.75 times of a wavelength of the first frequency band, and a length of the second antenna path R2 is between 0.5 and 0.75 times of a wavelength of the second frequency band. However, in other embodiments of the invention, the frequency ranges corresponding to the first frequency band and the second frequency band are not limited thereto.

Under the above configuration of the electronic device 100 of the embodiment, by using the metal frame 120 as a part of the antenna radiator, the first antenna path R1 radiating at the first frequency band and the second antenna path R2 radiating at the second frequency band are further defined, such that the electronic device 100 may have good and/or omnidirectional radiation coverage. As the metal frame 120 of the electronic device 100 is used as a part of the antenna radiator, the casing of the electronic device 100 may be designed to adopt a metal material for better looking appearance. In addition, the second terminal 132 of the radiator 130 is connected to the junction A1 in a direction perpendicular to the metal frame 120. Compared with the antenna module designed in the manner of slot coupling in the prior art, the antenna characteristics of the electronic device 100 are less affected by issues of coupling spacing and overcome difficulty of assembly alignment tolerance. In addition, by adjusting the turnings and a line width of the radiator 130, an impedance matching bandwidth of the electronic device 100 may be changed for customizations.

Figure 5:
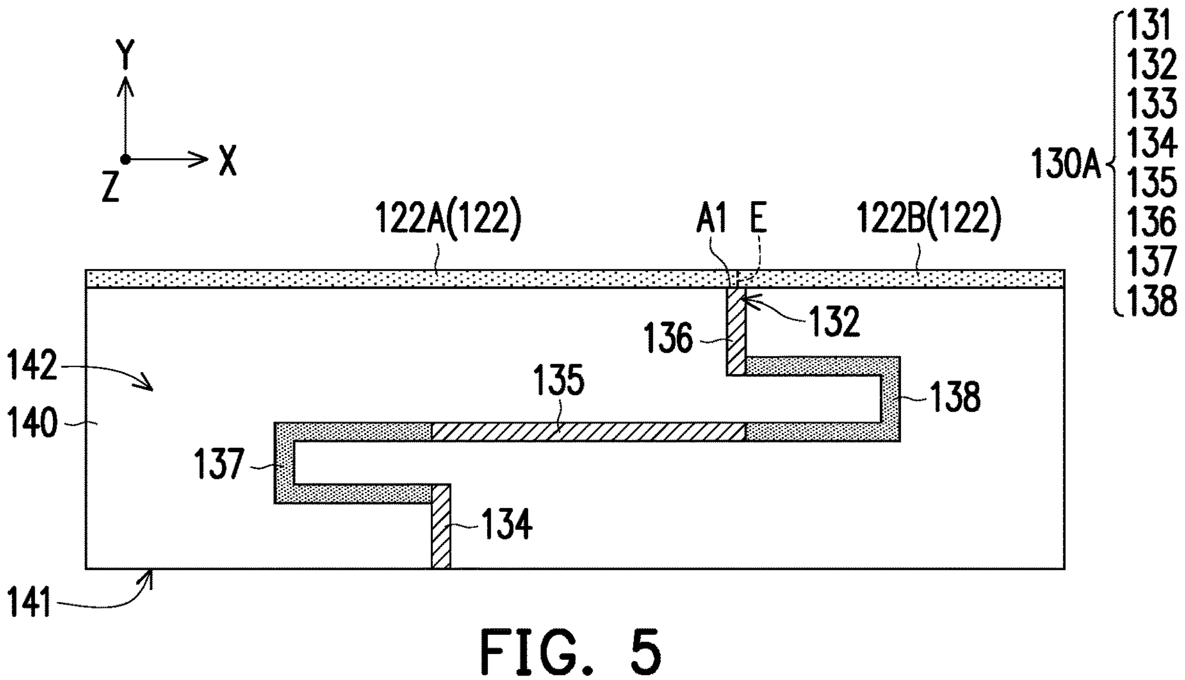
FIG. 5 is a schematic top view of an electronic device according to another embodiment of the invention.

FIG. 5 is a schematic top view of an electronic device according to another embodiment of the invention. Referring to FIG. 5, a radiator 130A according to another embodiment of the invention further includes a first U-shaped section 137 and a second U-shaped section 138. The first U-shaped section 137 is located between the second section 134 and the third section 135, and the second U-shaped section 138 is located between the third section 135 and the fourth section 136. The radiator 130A may have more turnings among the second section 134, the third section 135 and the fourth section 136 due to the configuration of the first U-shaped section 137 and the second U-shaped section 138, so as to adjust the impedance matching bandwidth of the electronic device 100 for customizations.

Figure 6:
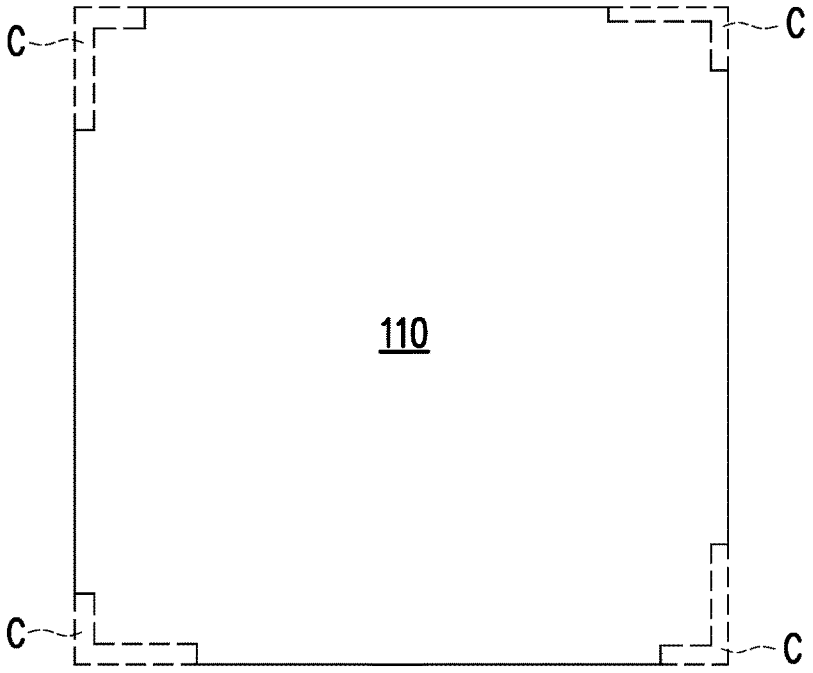
FIG. 6 is a schematic diagram of a layout of antenna modules on a metal bottom plate of the electronic device in FIG. 1.

FIG. 6 is a schematic diagram of a layout of antenna modules on the metal bottom plate of the electronic device in FIG. 1, and FIG. 7A to FIG. 7C are schematic diagrams of a layout of antenna modules on a metal bottom plate of an electronic device according to another embodiment of the invention.

Figure 7A:
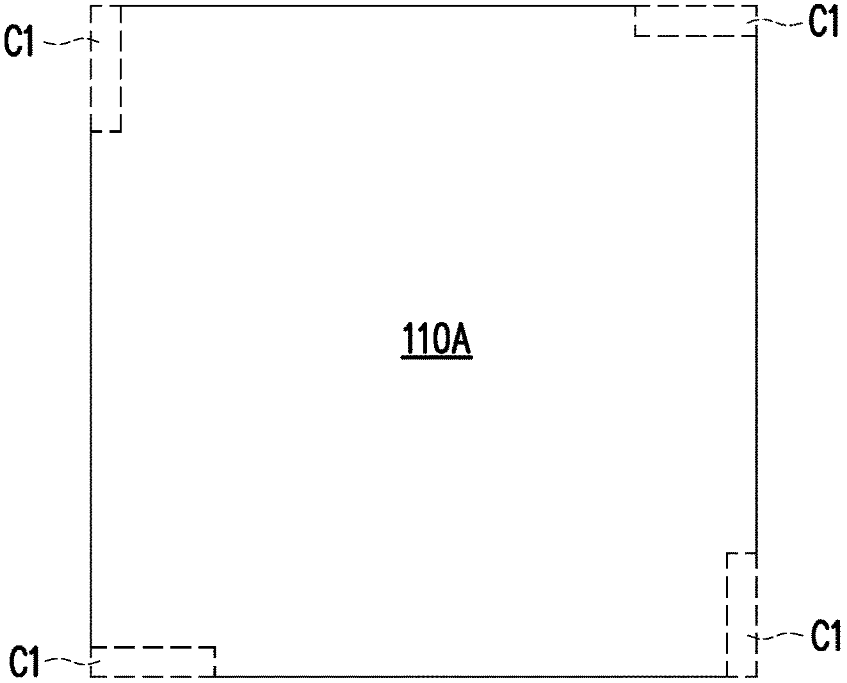
FIG. 7A to FIG. 7C are schematic diagrams of a layout of antenna modules on a metal bottom plate of an electronic device according to another embodiment of the invention.

Referring to FIG. 6 and FIG. 7A, compared to a metal bottom plate 110A shown in FIG. 7A with the metal bottom plate 110 shown in FIG. 6, a difference therebetween is that antenna modules C1 on the metal bottom plate 110A may also be arranged in a straight line pattern at the four corners of the metal bottom plate 110A. Antenna signals emitted by the antenna modules C1 located at the four corners may take care of the coverage in four directions, 90-degree each, which achieves an effect of multi-antenna configuration.

Figure 7B:
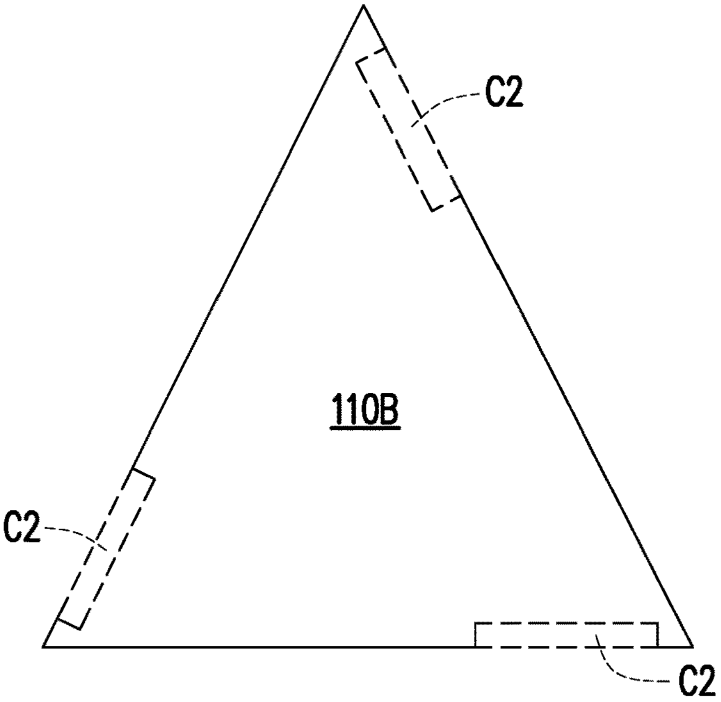

Referring to FIG. 7B and FIG. 7A, compared to a metal bottom plate 110B shown in FIG. 7B with the metal bottom plate 110A shown in FIG. 7A, a difference therebetween lies in a triangular appearance of the metal bottom plate 110B, and antenna modules C2 on the metal bottom plate 110B are arranged in a straight line pattern at three corners of the metal bottom plate 110B. The antenna signals emitted by the antenna module C2 located at the three corners may take care of the coverage in three directions, 120-degree each, which has a wider coverage and may achieve the effect of multi-antenna configuration.

Figure 7C:
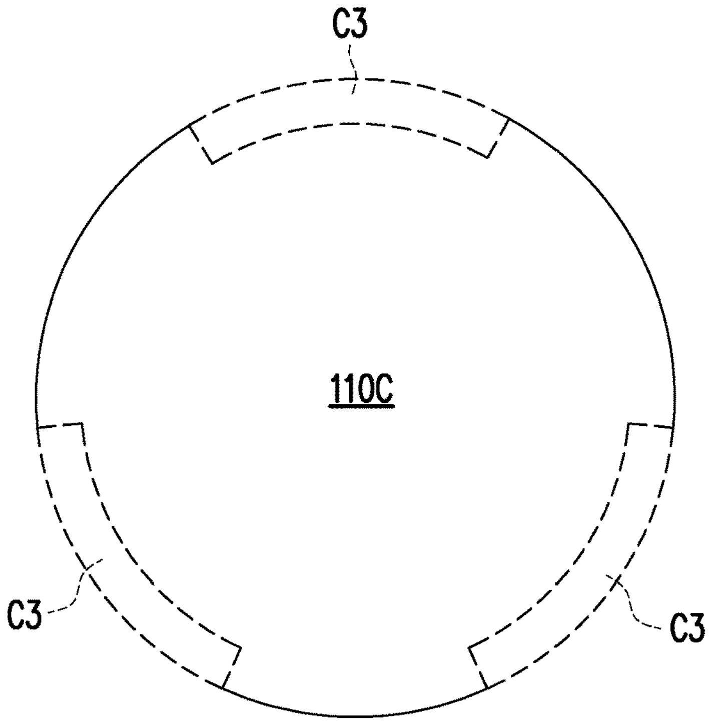

Referring to FIG. 7C and FIG. 7B, compared to a metal bottom plate 110C shown in FIG. 7C with the metal bottom plate 110B shown in FIG. 7B, a difference therebetween is that antenna modules C3 are evenly arranged on the metal bottom plate 110C in an arc shape. Antenna signals emitted by the antenna modules C3 may take care of the coverage in three directions, 120 degrees each, which has a wide coverage and may achieve the effect of multi-antenna configuration.

Figure 8:
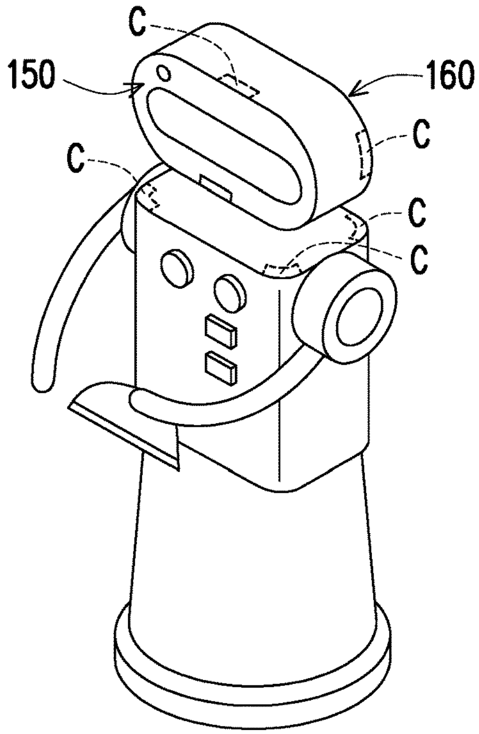
FIG. 8 is a schematic diagram of the electronic device of FIG. 1 applied to a robot.

FIG. 8 is a schematic diagram of the electronic device of FIG. 1 applied to a robot. Referring to FIG. 8, besides the plane where the shoulder of the robot is, some of the antenna modules C may also be symmetrically located on a first plane 150 and a second plane 160 of the head of the robot. Namely, the antenna modules C do not need to be all arranged on the same plane, and the flexibility of the arrangement of the radiators 130 (FIG. 1) in the antenna modules C may be increased to achieve customized designs.

Figure 9:
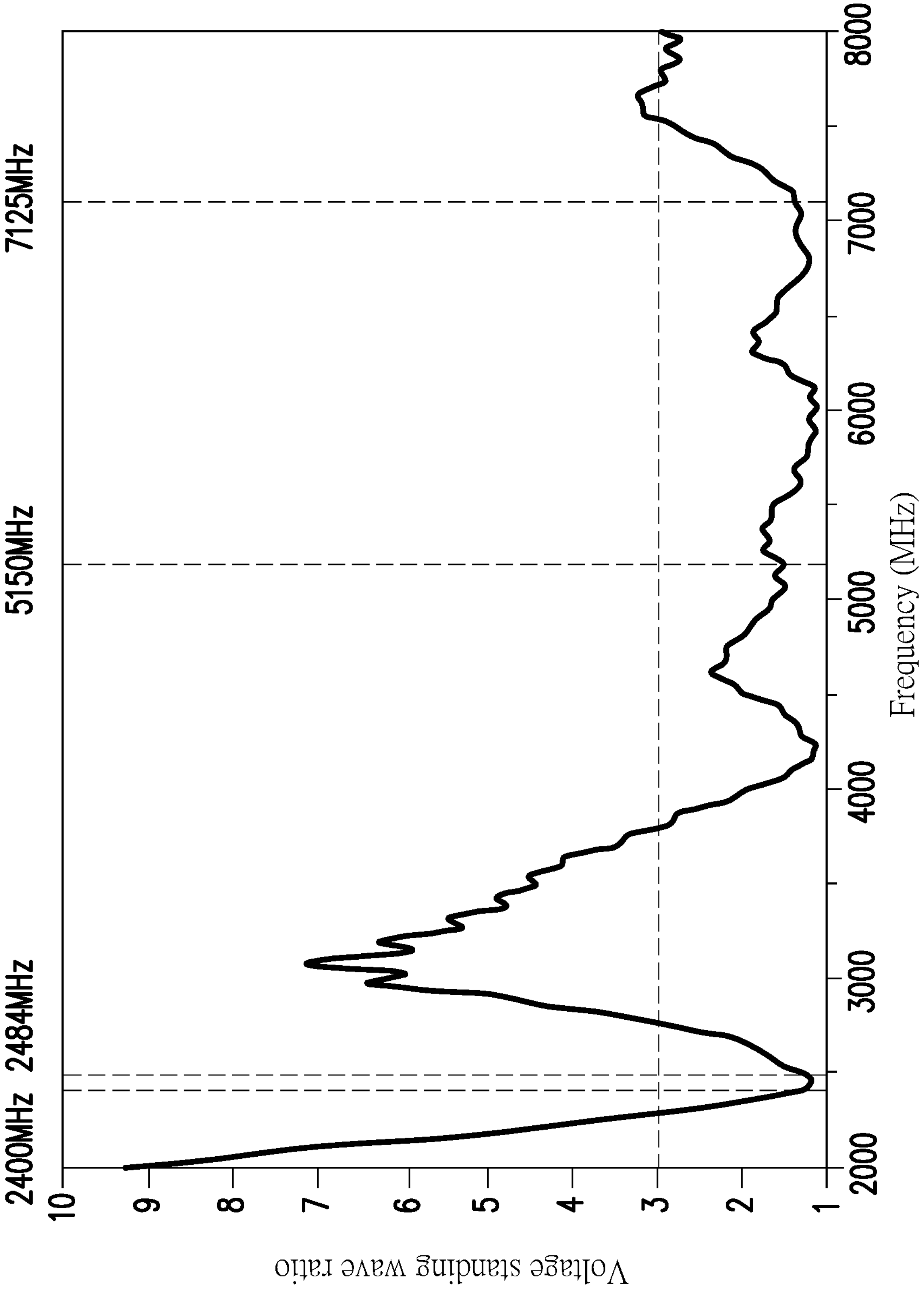
FIG. 9 is a plot diagram of frequency-VSWR (Voltage Standing Wave Ratio) of a single antenna module of the electronic device of FIG. 1.

FIG. 9 is a plot diagram of frequency—VSWR (Voltage Standing Wave Ratio) of a single antenna module of the electronic device of FIG. 1. Referring to FIG. 9, the VSWR of the single antenna module C of the electronic device 100 of the embodiment is less than 3 in either the first frequency band of 2400-2484 MHz or the second frequency band of 5150-7125 MHz, and the electronic device 100 has good impedance matching.

Figure 10:
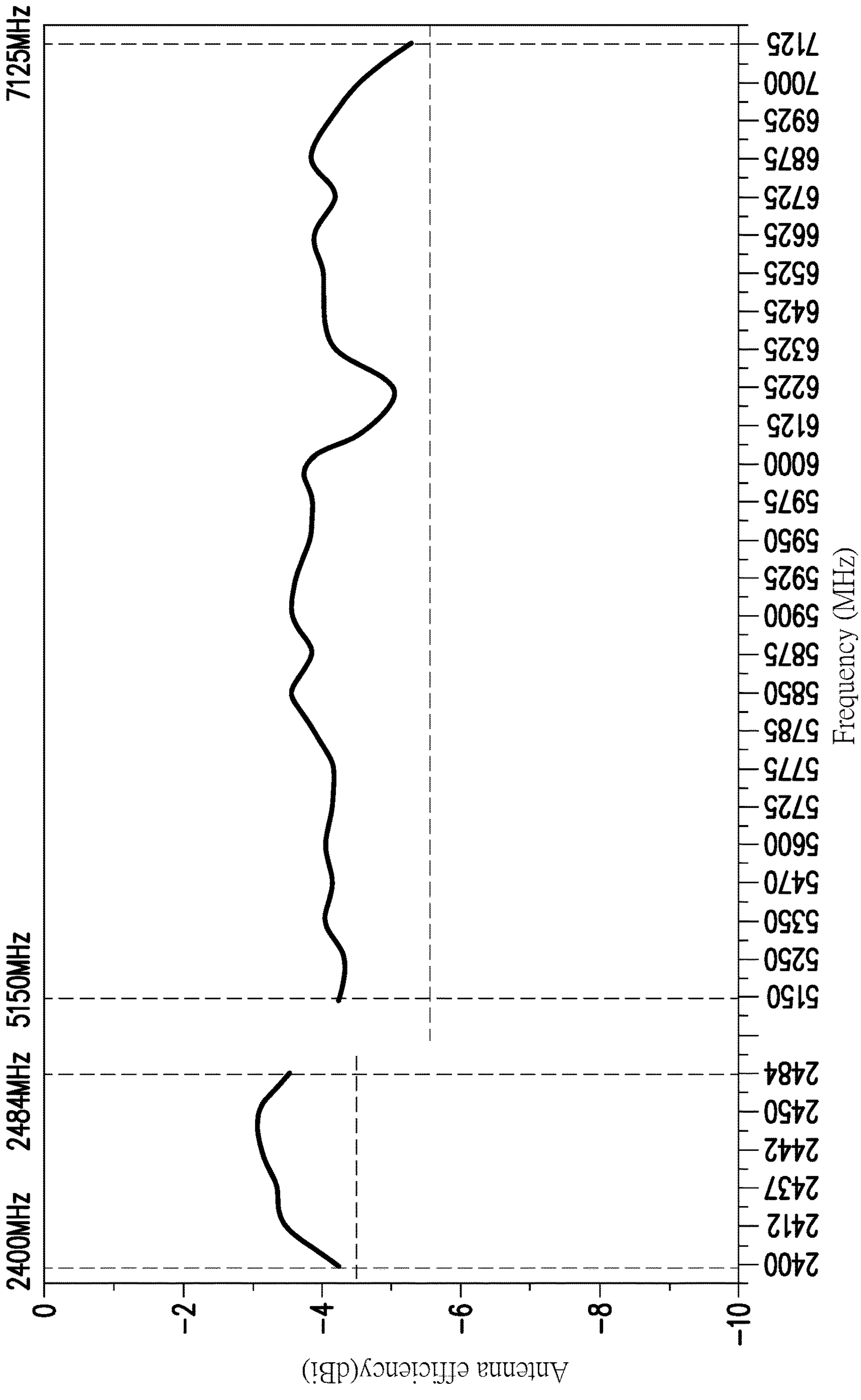
FIG. 10 is a plot diagram of frequency-antenna efficiency of the single antenna module of the electronic device of FIG. 1.

FIG. 10 is a plot diagram of frequency-antenna efficiency of the single antenna module of the electronic device of FIG. 1. Referring to FIG. 10, the antenna efficiency of the single antenna module C of the electronic device 100 in the embodiment is greater than −4.5 dBi in the first frequency band and −5.5 dBi in the second frequency band, which achieves good antenna performance.

In summary, in the electronic device of the invention, by using the metal frame as a part of the antenna radiator, the electronic device further defines the first antenna path radiating at the first frequency band and the second antenna path radiating at the second frequency band, so that the electronic device may have good and/or omnidirectional radiation coverage. As the metal frame of the electronic device is used as a part of the antenna radiator, the casing of the electronic device may be designed to adopt a metal material for better looking appearance. In addition, the second terminal of the radiator of an embodiment is connected to the junction in a direction perpendicular to the metal frame. Compared with the antenna module designed in the manner of slot coupling in the prior art, the antenna characteristics of the electronic device are less affected by issues of coupling spacing and overcome difficulty of assembly alignment tolerance. In addition, by adjusting the turnings and a line width of the radiator of an embodiment, an impedance matching bandwidth of the electronic device may be changed for customizations.

What is claimed is:

1. An electronic device, comprising:

a metal bottom plate, comprising at least one ground terminal;

a metal frame, comprising at least one slot, at least one disconnecting part, at least one first connecting part and at least one second connecting part, wherein each of the at least one slot is close to the metal bottom plate and separates the metal bottom plate from the corresponding disconnecting part, each of the at least one disconnecting part is located between the corresponding first connecting part and the corresponding second connecting part, and each of the at least one disconnecting part comprises a first part and a second part, the first part is close to the corresponding first connecting part, the second part is close to the corresponding second connecting part, and each of the at least one first connecting part and each of the at least one second connecting part are connected to the metal bottom plate; and at least one radiator, each having a plurality of turnings and comprising a first terminal and a second terminal, wherein the first terminal is a feeding terminal, and the second terminal intersects with the corresponding disconnecting part at a junction, and the junction is away from the corresponding slot, wherein the first terminal and the second terminal of each of the at least one radiator, a first part of the corresponding disconnecting part, the corresponding first connecting part and the ground terminal of the metal bottom plate form a first antenna path, and the first antenna path radiates at a first frequency band, the first terminal and the second terminal of each of the at least one radiator, a second part of the corresponding disconnecting part, the corresponding second connecting part and the ground terminal of the metal bottom plate form a second antenna path, and the second antenna path radiates at a second frequency band.

2. The electronic device as claimed in claim 1, wherein each of the at least one radiator extends in a normal direction of the metal frame and reaches the junction at the second terminal.

3. The electronic device as claimed in claim 1, wherein a length of the first antenna path is between 0.5 and 0.75 times of a wavelength of the first frequency band.

4. The electronic device as claimed in claim 1, wherein a length of the second antenna path is between 0.5 and 0.75 times of a wavelength of the second frequency band.

5. The electronic device as claimed in claim 1, wherein a width of each of the at least one slot is between 1 mm and 1.5 mm.

6. The electronic device as claimed in claim 1, further comprising at least one insulation bracket arranged adjacent to the at least one slot, the metal frame and the metal bottom plate, each of the at least one insulation bracket comprises a first surface and a second surface adjacent to each other, and each of the at least one radiator comprises a first section located on the first surface, and a second section, a third section and a fourth section located on the second surface, the feeding terminal is located at the first section, and the turnings are among the first section, the second section, the third section and the fourth section.

7. The electronic device as claimed in claim 6, wherein each of the at least one radiator further comprises a first U-shaped section and a second U-shaped section, the first U-shaped section is located between the second section and the third section, and the second U-shaped section is located between the third section and the fourth section.

8. The electronic device as claimed in claim 1, wherein each of the at least one ground terminal is close to the corresponding feeding terminal and separated from the feeding terminal.

9. The electronic device as claimed in claim 1, wherein the at least one slot comprises a plurality of slots, the at least one radiator comprises a plurality of radiators, positions of the radiators correspond to positions of the slots, the slots and the radiators are arranged at equal intervals on the metal frame, and the slots are located on a same plane.

10. The electronic device as claimed in claim 1, wherein the at least one slot comprises a plurality of slots, the at least one radiator comprises a plurality of radiators, the radiators correspond to the slots, some of the slots are symmetrically located on a first plane, and some of the slots are symmetrically located on a second plane.

* * * * *